United States Patent [19]

Rossmann

[11] 4,067,662

[45] Jan. 10, 1978

[54] THERMALLY HIGH-STRESSED COOLED COMPONENT, PARTICULARLY A BLADE FOR TURBINE ENGINES

[75] Inventor: Axel Rossmann, Karlsfeld, Germany

[73] Assignee: Motoren- und Turbinen-Union Munchen GmbH, Munich, Germany

[21] Appl. No.: 651,147

[22] Filed: Jan. 21, 1976

[30] Foreign Application Priority Data

Jan. 28, 1975 Germany .............................. 2503285

[51] Int. Cl.² ................................................ F01D 5/18
[52] U.S. Cl. ............................ 416/97 A; 416/231 R; 416/241 B
[58] Field of Search ................ 416/231 R, 231 A, 95, 416/96, 241 B

[56] References Cited

U.S. PATENT DOCUMENTS

| | | | |
|---|---|---|---|
| 2,851,216 | 9/1958 | Scanlan et al. | 416/90 |
| 2,857,657 | 10/1958 | Wheeler | 29/156.8 |
| 2,946,681 | 7/1960 | Probst et al. | 416/241 X |
| 3,011,761 | 12/1961 | Conway et al. | 416/90 |
| 3,067,982 | 12/1962 | Wheeler | 416/90 |
| 3,114,961 | 12/1963 | Chambers et al. | 29/156.8 B |
| 3,529,902 | 9/1970 | Emmerson | 415/115 |
| 3,656,863 | 4/1972 | DeFeo | 416/97 |
| 3,706,508 | 12/1972 | Moskowitz et al. | 416/97 X |

Primary Examiner—Everette A. Powell, Jr.

[57] ABSTRACT

A thermally highly stressed, cooled component, more particularly, a blade for turbine engines, and a method for manufacturing the blade. A component of the above-mentioned type in which a central supporting core formed of a solid material has connected thereto several short, radially outwardly projecting ridges which, in turn, carry an outer shroud concentrically encompassing the supporting core, and which is made of a through-porous material, whereby the supporting core, ribs, and outer shroud are cast in a single piece.

2 Claims, 3 Drawing Figures

THERMALLY HIGH-STRESSED COOLED COMPONENT, PARTICULARLY A BLADE FOR TURBINE ENGINES

FIELD OF THE INVENTION

This invention relates to a thermally highly stressed, cooled component, more particularly, to a blade for turbine engines, and to a method for manufacturing the blade.

DISCUSSION OF THE PRIOR ART

Since the operating temperatures of thermal engines have recently been raised to still higher levels, while on the other hand, no materials have been formed exhibiting sufficient mechanical strength or durability at these extremely high operating temperatures, one presently proceeds that components intended for extremely high temperatures, such as gas turbine blades, are in all instances provided with a special cooling device to maintain their temperature at an acceptable level.

In addition to many other cooling devices and methods for such thermally highly stressed components, developments have become known by means of which the compnents are provided with porous surfaces, through which a cooling medium flows outwardly from an inner cavity and thus forms a cooling boundary layer on the surface of the component. This practical application of the so-called effusion cooling has, however, failed to succeed mainly because of difficulties encountered in the manufacture of porous, highly heat-resistant layers and in their fastening to a supporting core.

SUMMARY OF THE INVENTION

Accordingly, it is an object of the present invention to provide a thermally highly-stressed component, and more particularly, a turbine engine blade, on the one hand, to which there is applicable a highly effective effusion cooling while on the other hand, exhibiting a high mechanical strength and producible at a reasonable economy.

It is a particular object of the present invention to provide a component of the above-mentioned type in which a central supporting core formed of a solid material has connected thereto several short, radially outwardly projecting ridges which, in turn, carry an outer shroud concentrically encompassing the supporting core, and which is made of a through-porous material, whereby, the supporting core, ribs, and outer shroud are cast in a single piece.

It has been shown that a component designed in accordance with the present invention, particularly a blade for turbine engines, not only evinces excellent strength properties, particularly with respect to flexural bending strength, but can be concurrently subjected to extremely hot gas streams without its own temperature exceeding permissible values. The ridges between the supporting core and the outer shroud concurrently form cooling media passageways extending tangentially along the supporting core, so that a uniform distribution of the cooling medium flow is attainable over the outer shroud, and they further aid in keeping the weight of the component low notwithstanding its high inherent strength, which is of particularly significant advantage in the case of the component being a rotor blade, in that the connection of the rotor blade and the rotor disc is the more complex the higher the weight of the blade.

The present invention relates further to a method for manufacturing a component as described hereinabove, more particularly a turbine engine blade, and is characterized by the following process steps:

a. Manufacture of a part core having the shape of the outer shroud of the component, consisting of through-porous ceramic foam material and thereto applied, inwardly projecting ribs of a compacted ceramic material;

b. Manufacture of a complete core corresponding to the final shape of blade through use of the part core and fusible material in an injection mold;

c. Use of molding material to make a mold around the complete core or blade;

d. Removing of the fusible material by melting;

e. Casting the blade in a vacuum;

f. Recovering the ceramic partial core through chemical means.

The principle of the inventive method is predicated in that, first, there is made a core of foamed ceramic material, which constitutes the negative form of the desired component, then to pour the material of the component in a vacuum around the core, this material then completely permeating the through-porous foamed ceramic material, and thereafter to use chemical means to completely dissolve the core of foamed ceramic material, so that the previous walls of the ceramic foam material now form pores or cavities which serve as cooling passageways. The major advantage of the method pursuant to the present invention is that the entire component can be made from a single piece without its single-piece nature requiring mechanical procedures to provide effusion pores or cooling medium distribution passageways. This makes it possible to provide a very large number of effusion pores in the component and concurrently select an extremely strong component material which admits of little, if any, mechanical processing.

BRIEF DESCRIPTION OF THE DRAWINGS

Further objects and advantages of the present invention will now become more readily apparent from the following description, taken in conjunction with the accompanying drawings; in which.

DETAILED DESCRIPTION

Figure 1:
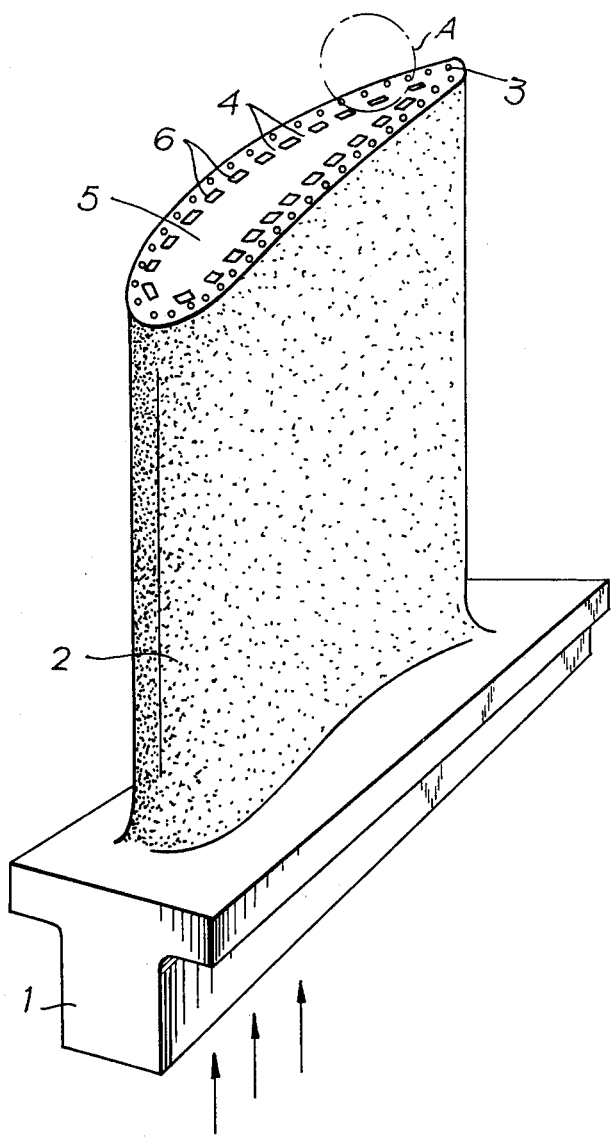
FIG. 1 shows an effusion-cooled axial-flow turbine blade which is constructed in accordance with the present invention.

The turbine blade illustrated in FIG. 1 has a blade root 1 which is provided with a central bore, and a thereto connected airfoil 2 whose outer shroud 3 is constituted of a through-porous material. The porous outer shroud 3 is carried by short ribs or ridges 4 extending radially from a central supporting core 5. Arranged between the ridges 4 on the central core are cooling passageways 6 extending tangentially to support core 5 for uniform distribution, over the entire inner surface of outer shroud 3, of the cooling medium entering through the central bore in the blade root, along the direction indicated by arrow 7. Due to the through-porosity of the outer shroud 3, the cooling medium permeates from the passageway 6 through the pores of the outer shroud up to the surface of the airfoil, where it forms a cooling boundary layer. The entire blade, including blade root 1 and airfoil 2, is cast in a single piece with no need for mechanical working to incorporate cooling passageways or bores.

Figure 2:
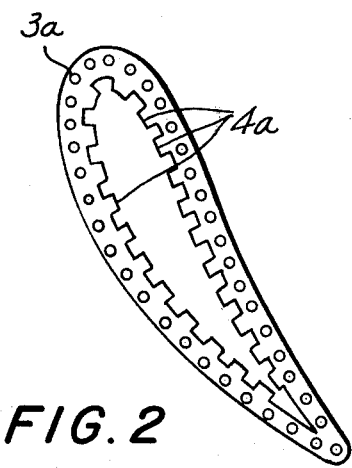
FIG. 2 shows a ceramic core used in the manufacture of the turbine blade of FIG. 1.

The ceramic part core illustrated in FIG. 2 represents the negative form for the outer shroud inclusive the cooling passageways 6 of an airfoil 2 of FIG. 1. The outer shroud 3a of the core consists of a foamed, through-porous ceramic material, essentially constituted of aluminum oxide, whereas the ridges 4a are constituted of the same material but in compacted form and are directly molded to the inner surface of the outer shroud 3a.

Figure 3:
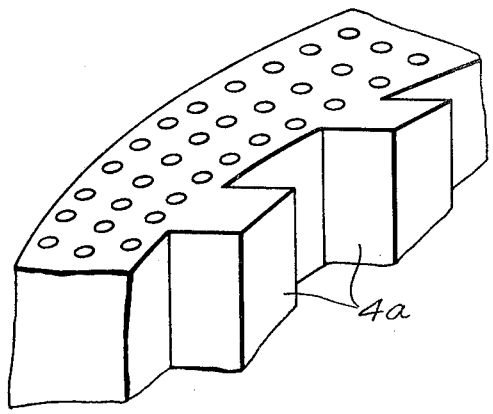
FIG. 3 is an enlarged fragmentary detail of FIG. 2.

FIG. 3 is enlarged fragmentary detail section A from FIG. 2. When the procedure is completed by step (f), the place of the ceramic ridges 4a is taken by the cooling passageways 6, and the place of the previous ceramic walls of the foamed ceramic material is taken by the effusion cooling pores which extend from the cooling passageways 6 to the outer surface of the airfoil 2.

While there has been shown what is considered to be the preferred embodiment of the invention, it will be obvious that modifications may be made which come within the scope of the disclosure of the specification.

1. Thermally highly stressed, cooled component in form of an integral single-piece element, such as a turbine engine blade, comprising a centrally arranged supporting core of a solid material; plurality of short radially projecting ridges extending from said core; an outer shroud carried by said ridges concentrically enveloping the supporting core, said shroud being made of a foamed through-porous material, and said supporting core, ridges, and outer shroud comprised of ceramic material cast in a single piece.

2. A thermally, highly stressed turbine blade as defined in claim 1 comprising; a root member having a central bore; and an air foil connected to said root member, said air foil having an outer shroud of through-porous material; the ridges on rib means carrying said porous outer shroud; said rib means extending radially from said central supporting core; cooling passages between portions of said rib means on said central core and extending tangentially to said support core for uniform distribution over substantially the entire inner surface of said outer shroud, said passages conducting cooling medium entering through said central bore in said root member; said cooling medium permeating from said passages through the pores of said outer shroud up to the surface of said air foil to form a cooling boundary layer, said blade, root member and air foil comprising an integral single-piece casting, said ceramic material comprising substantially aluminium oxide, said rib means being molded to the inner surface of said outer shroud.

* * * * *